US012800008B2

(12) United States Patent
Lu

(10) Patent No.: US 12,800,008 B2
(45) Date of Patent: Nov. 17, 2026

(54) DAMPING STRUCTURE

(71) Applicant: Ningbo Weifeng Intelligent Technology Co., Ltd., Ningbo (CN)

(72) Inventor: Qi Lu, Ningbo (CN)

(73) Assignee: Ningbo Weifeng Intelligent Technology Co., Ltd., Ningbo (CN)

( * ) Notice: Subject to any disclaimer, the term of this patent is extended or adjusted under 35 U.S.C. 154(b) by 351 days.

(21) Appl. No.: 18/602,190

(22) Filed: Mar. 12, 2024

(65) Prior Publication Data

US 2025/0251030 A1 Aug. 7, 2025

(30) Foreign Application Priority Data

Feb. 7, 2024 (CN) ......................... 202420287349.7

(51) Int. Cl.
*F16F 15/04* (2006.01)
*F16B 7/10* (2006.01)

(52) U.S. Cl.
CPC ................ *F16F 15/04* (2013.01); *F16B 7/10* (2013.01); *F16F 2230/0029* (2013.01); *F16F 2234/06* (2013.01); *F16F 2238/026* (2013.01)

(58) Field of Classification Search
CPC ......... F16F 2230/0029; F16F 2238/026; F16F 2234/06; F16F 1/04
See application file for complete search history.

(56) References Cited

FOREIGN PATENT DOCUMENTS

CN 219262896 U * 6/2023
DE 102020125988 A1 * 4/2022 ............. B60K 15/05

OTHER PUBLICATIONS

CN 219262896 U Machine Translation (No Date).*
DE 102020125988 A1 Machine Translation (No Date).*

* cited by examiner

*Primary Examiner* — Robert A. Siconolfi
*Assistant Examiner* — Shea Woodrow Irvin
(74) *Attorney, Agent, or Firm* — Wang Law Firm, Inc.

(57) ABSTRACT

The present disclosure provides a damping structure. The damping structure includes two damping assemblies which are oppositely arranged, and a gap is formed between the two damping assemblies. An inner wall of the damping assembly is provided with a locating piece for locating, and an outer wall of the damping assembly is provided with damping surfaces which are in contact with a tube wall and are used for providing damping during relative movement. An elastic cavity is formed in the damping assembly, and the elastic cavities on the two damping assemblies are oppositely arranged. The damping structure also includes an elastic piece. Both sides of the elastic piece are provided with elastic arms bent into arcs. The two elastic arms are respectively arranged in two elastic cavities, and a plurality of positions on the elastic arm abut against support structures in the elastic cavity.

8 Claims, 9 Drawing Sheets

DAMPING STRUCTURE

TECHNICAL FIELD

The present disclosure belongs to the technology of damping structures in the telescopic tube in the field of photography and video recording auxiliary devices, and specifically relates to a damping structure.

BACKGROUND

The photography and video recording auxiliary device is common equipment, such as a tripod, a selfie stick and a support rod. In the prior art, the telescopic support rod is generally of a multi-section sleeve structure, namely a telescopic tube.

In the prior art, the telescopic tube is a combination of at least two linear tube fittings which are concentrically sleeved and can realize relative axial displacement to change the overall length. In order to achieve uniform or even smooth hand feeling between adjacent tubes during expansion and contraction, a damping structure is usually arranged between the inner tube and the outer tube, but the damping mechanism in the existing telescopic tube is composed of a single spring, and the rebound force of the spring cannot be evenly released between the inner tube and the outer tube, resulting in the inner tube and the outer tube being fast and slow, tight and loose during expansion and contraction. In addition, the spring lacks a proper fixed structure between the inner tube and the outer tube. Once the expansion and contraction times are more, the spring is easy to shift, skew or even fall off, resulting in short service life.

Based on the above problems in the prior art, the damping structure in the telescopic tube is further designed and improved in the present disclosure.

SUMMARY

Aiming at the disadvantages in the prior art, the present disclosure provides a damping structure used for being installed in the telescopic tube. The damping structure is provided with a spring with a special structure, so that elastic force can be ensured to be applied uniformly, the stability is high when in use, the damping structure is unlikely to shift, skew and fall off, the service life of the damping structure is greatly prolonged, and at the same time, the damping structure is simple in structure, convenient to assemble and good in damping hand feeling.

The present disclosure is solved through the following technical scheme.

The present disclosure provides a damping structure. The damping structure includes two damping assemblies which are oppositely arranged, and a gap is formed between the two damping assemblies. An inner wall of the damping assembly is provided with a locating piece for locating, and an outer wall of the damping assembly is provided with damping surfaces which are in contact with a tube wall and are used for providing damping during relative movement. An elastic cavity is formed in the damping assembly, and the elastic cavities on the two damping assemblies are oppositely arranged. The damping structure also includes an elastic piece. Both sides of the elastic piece are provided with elastic arms bent into arcs. The two elastic arms are respectively arranged in two elastic cavities, and a plurality of positions on the elastic arm abut against support structures in the elastic cavity.

In the present disclosure, the elastic piece with a special structure is arranged to ensure that the elastic force can be uniformly applied to the damping assembly. Specifically, in the present disclosure, both sides of the elastic piece are provided with elastic arms which are arc-shaped, and a plurality of positions of the elastic arms can well abut against the support structure in the elastic cavity, so that it is ensured that the elastic force can be applied at the positions to spread the damping assembly. Compared with the spring with the conventional structure, the elastic piece of the structure can well avoid the phenomenon that the conventional spring is easy to shift, skew and fall off, and the stability is high when in use. After the damping structure is installed on the telescopic tube, and is located on the inner tube by the locating piece on the inner wall of the damping assembly and moves synchronously with the inner tube. During the expansion and contraction process of the inner tube and the outer tube of the telescopic tube, when the inner tube and the outer tube move relatively, the outer wall of the damping assembly rubs on the inner wall of the outer tube. At this time, the damping force is generated by the damping surface, the hand feeling is good, and the overall service life is long.

In an optimized embodiment, the elastic piece is formed by a rod body, and the rod body is a metal rod body or a polymer rod body. The elastic piece is formed through the bending of the rod body, the production technology is simple, and the production cost is low.

In an optimized embodiment, the elastic piece includes a spiral structure located at the central position to form at least one circle of screw for storing and applying elastic force, and the symmetry of the main structure of the elastic piece is ensured, so that balanced elastic force can be applied uniformly. Straight sections extend from both ends of the spiral structure for providing rigid force, and the elastic arm extends from an outer end of the straight section through a bending section. The bending section can be compressed when being stressed to store elastic force and provide elastic support, and can cooperate with the arc-shaped elastic arm to achieve better and more uniform elastic support effect.

In an optimized embodiment, the two sections of straight sections extend parallel to each other in the same direction, and the two elastic arms are of symmetrical structures in the top view direction. The structure can ensure the structural stability of the whole elastic piece. Specifically, the directions of the straight sections on both sides of the elastic piece are the same, and the rotating force generated by the elastic arms on both sides during the extrusion process can be counteracted, so that the whole elastic piece does not generate circumferential rotating force, and the structure is stable. If the directions of the two sections of straight sections are opposite, the rotating force generated by the elastic arms on both sides during the extrusion process is likely to lead to the rotation tendency of the spiral structure, and then the circumferential rotation force tendency is generated by the elastic piece as a whole, resulting in the decrease of the stability of the structure and the decrease of the service life.

In an optimized embodiment, observed from the top view, the spiral structure has a diameter of L1, and the distance between the outermost end of the elastic arm and the spiral structure is L2, and L1: L2=1.4-1.6. Under the structure size, the overall strength of the elastic piece is high, and the stored elastic force is appropriate. The damping effect is good when in use.

In an optimized embodiment, observed from the top view, the distance between the outermost end of the bending section and the spiral structure is L3, and L1: L3=2.3-2.5. The distance between a tail end of the elastic arm and the spiral structure is L4, and L1: L4=1.8-1.9. Under the structure size, the overall strength of the elastic piece is high, the provided elastic force is high in uniformity, and the damping effect is good when in use.

In an optimized embodiment, a plurality of support plates as the support structures are arranged in the elastic cavity. The elastic arm abuts against the support plate. Through the arrangement of the support plate, the structural strength in the elastic cavity is obviously improved. At the same time, the support plates abut against the elastic arm, and the elastic force of the elastic arm can be well received at multiple positions, so that it is ensured that the elastic force is uniformly applied to the damping assembly, and the stability is high.

In an optimized embodiment, spacing cavities are formed in both ends of the elastic cavity through spacing boards, and the two spacing boards are used for limiting the bending section at one end of the elastic arm and the tail end at the other end of the elastic arm. The elastic arm is prevented from falling off or inclining, so that the stability is high. At the same time, excessive extrusion deformation of the elastic arm is also avoided to ensure the whole structural strength.

In an optimized embodiment, five support plates are uniformly distributed in each elastic cavity, and the structure is stable.

In an optimized embodiment, the outer wall of the damping assembly is provided with a plurality of protruding damping surfaces, and an inclined plane is arranged between the damping surface and the outer wall. The effect of damping friction is good.

In an optimized embodiment, the elastic cavity is arranged at one end of the damping assembly, and is formed through a double-layer board body in the axial direction. The support plate and the spacing board are integrally formed in the elastic cavity, and the structural strength is high.

Compared with the prior art, the present disclosure has the following beneficial effects. The damping structure which can be installed in the telescopic tube fitting in the present disclosure is provided and is provided with a spring with a special structure, so that elastic force can be ensured to be applied uniformly, the stability is high when in use, the damping structure is unlikely to shift, skew and fall off, the service life of the damping structure is greatly prolonged, and at the same time, the damping structure is simple in structure, convenient to assemble and good in damping hand feeling.

DETAILED DESCRIPTION OF THE EMBODIMENTS

Figure 1:
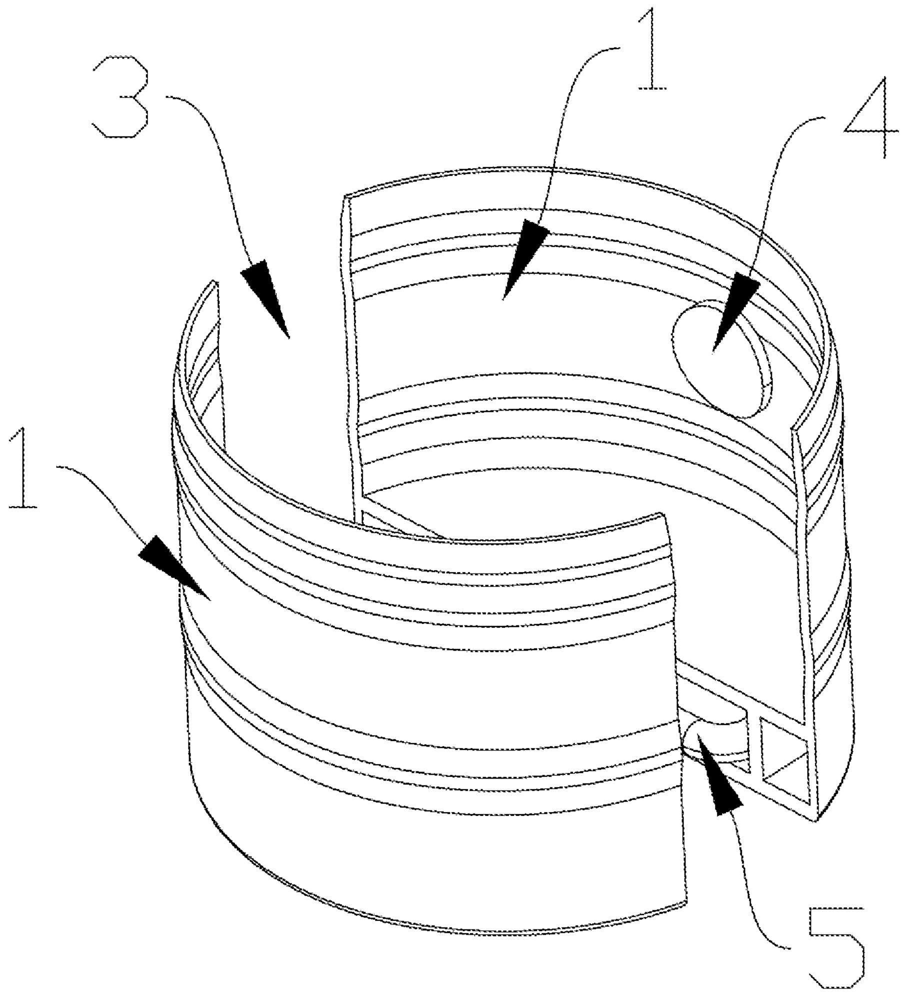
FIG. 1 is a first space diagram of a damping structure in the present disclosure.
Figure 2:
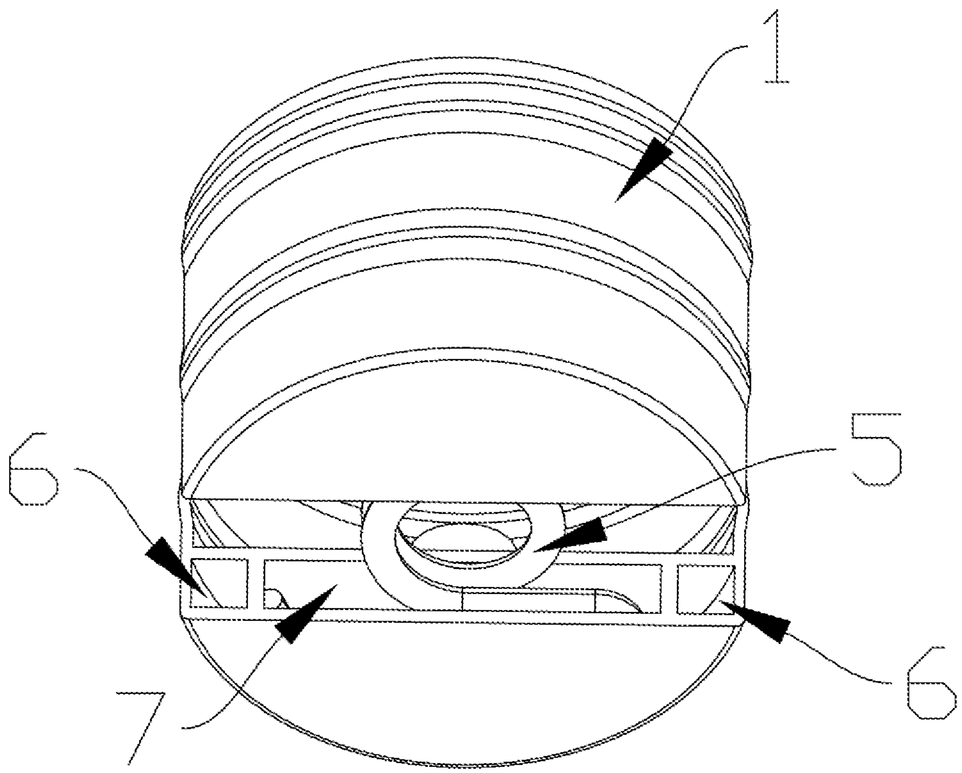
FIG. 2 is a second space diagram of a damping structure in the present disclosure.
Figure 3:
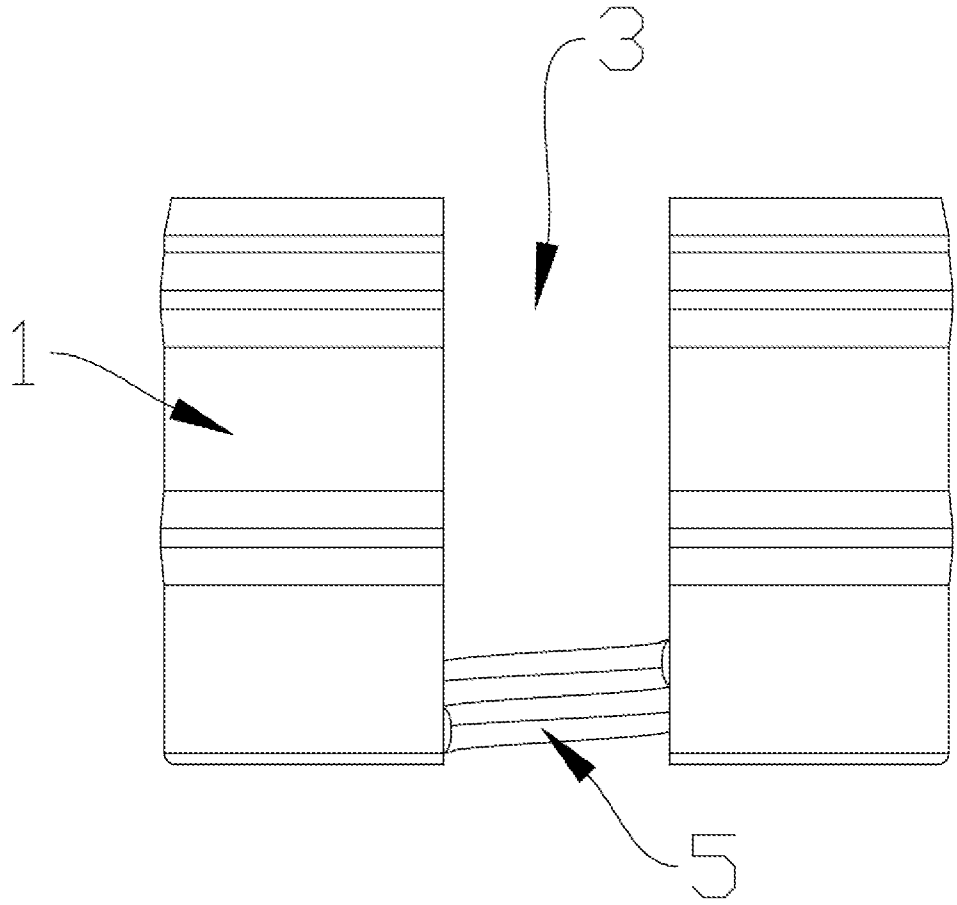
FIG. 3 is a side view of a damping structure in the present disclosure.

The present disclosure is further described in detail in conjunction with the attached figures and embodiments.

In the following embodiments, the same or similar reference mark numbers indicate the same or similar elements or elements with the same or similar functions. The embodiments described below by reference to the attached figures are exemplary only for explaining the present disclosure and are not to be construed as limiting the present disclosure.

In the description of the present disclosure, it needs to be illustrated that the indicative direction or position relations of the terms such as “center”, “longitudinal”, “transverse”, “length”, “width”, “thickness”, “upper”, “lower”, “front”, “rear”, “left”, “right”, “vertical”, “horizontal”, “top”, “bottom”, “inside”, “outside”, “clockwise” and “counterclockwise” are direction or position relations illustrated based on the attached figures, just for facilitating the description of the present disclosure and simplifying the description, and the terms cannot be understood as the restriction of the present disclosure. In addition, the terms “first” and “second” are merely intended for a purpose of description, and shall not be understood as an indication or implication of relative importance or implicit indication of the number of indicated technical features. In the description of the present disclosure, it needs to be illustrated that, except as otherwise noted, the terms such as “install”, “link” and “connect” should be generally understood. For those skilled in the art, the specific meanings of the terms in the present disclosure can be understood according to specific conditions.

Referring to FIG. 1 to FIG. 9, a damping structure used in a telescopic tube fitting in the present disclosure includes two damping assemblies 1 which are oppositely arranged, and a gap 3 is formed between the two damping assemblies 1. An inner wall of the damping assembly 1 is provided with a locating piece 4 for locating, and an outer wall of the damping assembly 1 is provided with damping surfaces 11 which are in contact with a tube wall and are used for providing damping during relative movement. An elastic cavity 7 is formed in the damping assembly 1, and the elastic cavities 7 on the two damping assemblies 1 are oppositely arranged. The damping structure also includes an elastic piece 5. Both sides of the elastic piece 5 are provided with elastic arms 52 bent into arcs. The two elastic arms 52 are respectively arranged in two elastic cavities 7, and a plurality of positions on the elastic arm 52 abut against support structures in the elastic cavity 7.

Figure 8:
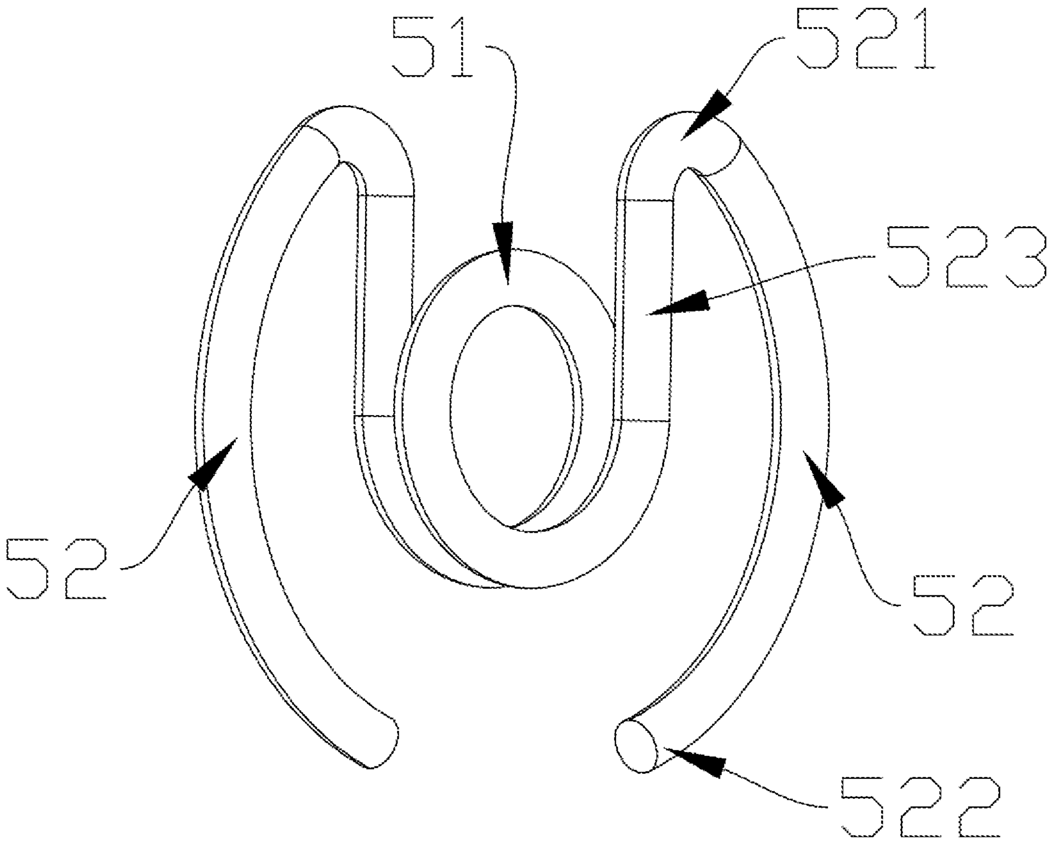
FIG. 8 is a space diagram of an elastic piece in the present disclosure.
Figure 9:
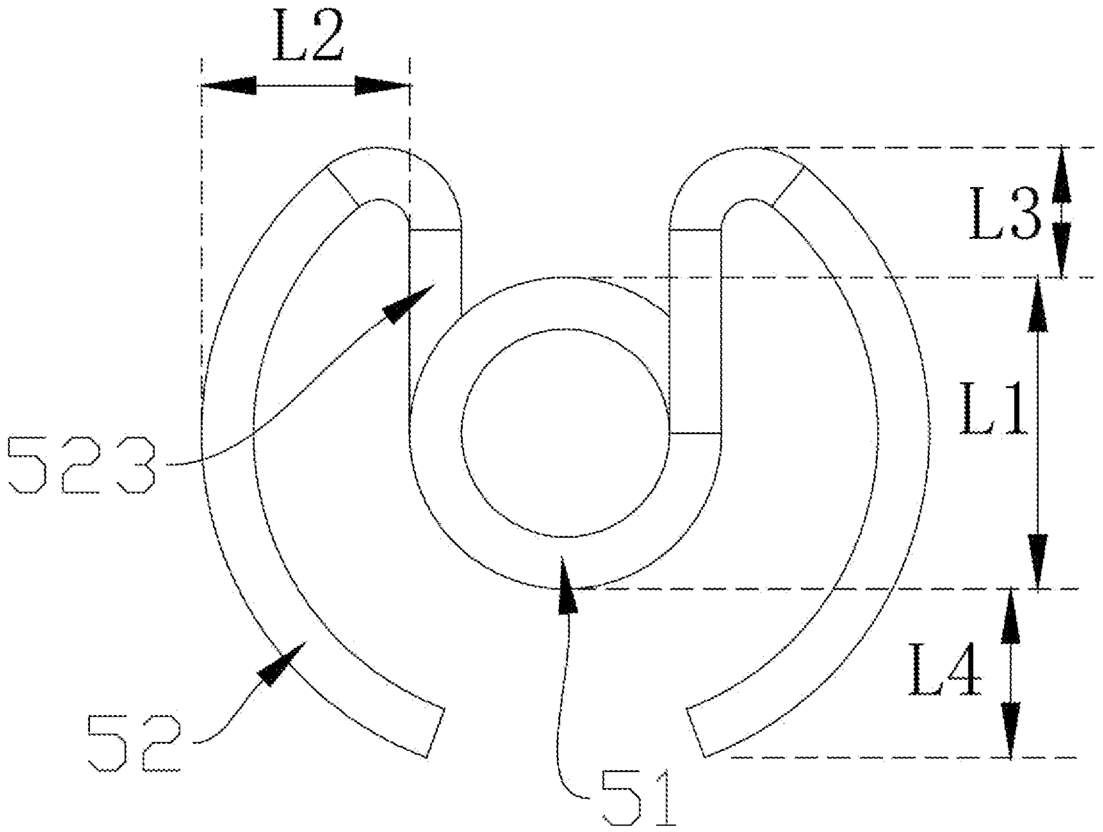
FIG. 9 is a top view of an elastic piece in the present disclosure.

Specifically, from FIG. 8 and FIG. 9, it can be seen that in the present disclosure, the elastic piece 5 includes a spiral structure 51 located at the central position to form at least one circle of screw for storing and applying elastic force, and the symmetry of the main structure of the elastic piece 5 is ensured, so that balanced elastic force can be applied uniformly. Straight sections 523 extend from both ends of the spiral structure 51 for providing rigid force, and the elastic arm 52 extends from an outer end of the straight section 523 through a bending section 521. The bending section 521 can be compressed when being stressed to store elastic force and provide elastic support, and can cooperate with the arc-shaped elastic arm 52 to achieve better and more uniform elastic support effect.

In the specific embodiment of the present disclosure, the two sections of straight sections 523 extend parallel to each other in the same direction, and the two elastic arms 52 are of symmetrical structures in the top view direction. The structure can ensure the structural stability of the whole elastic piece 5. Specifically, the directions of the straight sections 523 on both sides of the elastic piece 5 are the same, and the rotating force generated by the elastic arms 52 on both sides during the extrusion process can be counteracted, so that the whole elastic piece 5 does not generate circumferential rotating force, and the structure is stable. If the directions of the two sections of straight sections 523 are opposite, the rotating force generated by the elastic arms 52 on both sides during the extrusion process is likely to lead to the rotation tendency of the spiral structure 51, and then the circumferential rotation force tendency is generated by the elastic piece 5 as a whole, resulting in the decrease of the stability of the structure and the decrease of the service life.

Further, in the present disclosure, observed from the top view, the spiral structure 51 has a diameter of L1, and the distance between the outermost end of the elastic arm 52 and the spiral structure 51 is L2, and L1: L2=1.4-1.6. Under the structure size, the overall strength of the elastic piece 5 is high, and the stored elastic force is appropriate. The distance between the outermost end of the bending section 521 and the spiral structure 51 is L3, and L1: L3=2.3-2.5. The distance between a tail end 522 of the elastic arm 52 and the spiral structure 51 is L4, and L1: L4=1.8-1.9. Under the structure size, the overall strength of the elastic piece 5 is high, the provided elastic force is high in uniformity, and the damping effect is good when in use.

In the embodiment of the present disclosure, the elastic piece 5 is formed by a rod body, and the rod body is a metal rod body or a polymer rod body. The rod body can be made from conventional materials for manufacturing springs. The elastic piece 5 is formed through the bending of the rod body, the production technology is simple, and the production cost is low.

Figure 4:
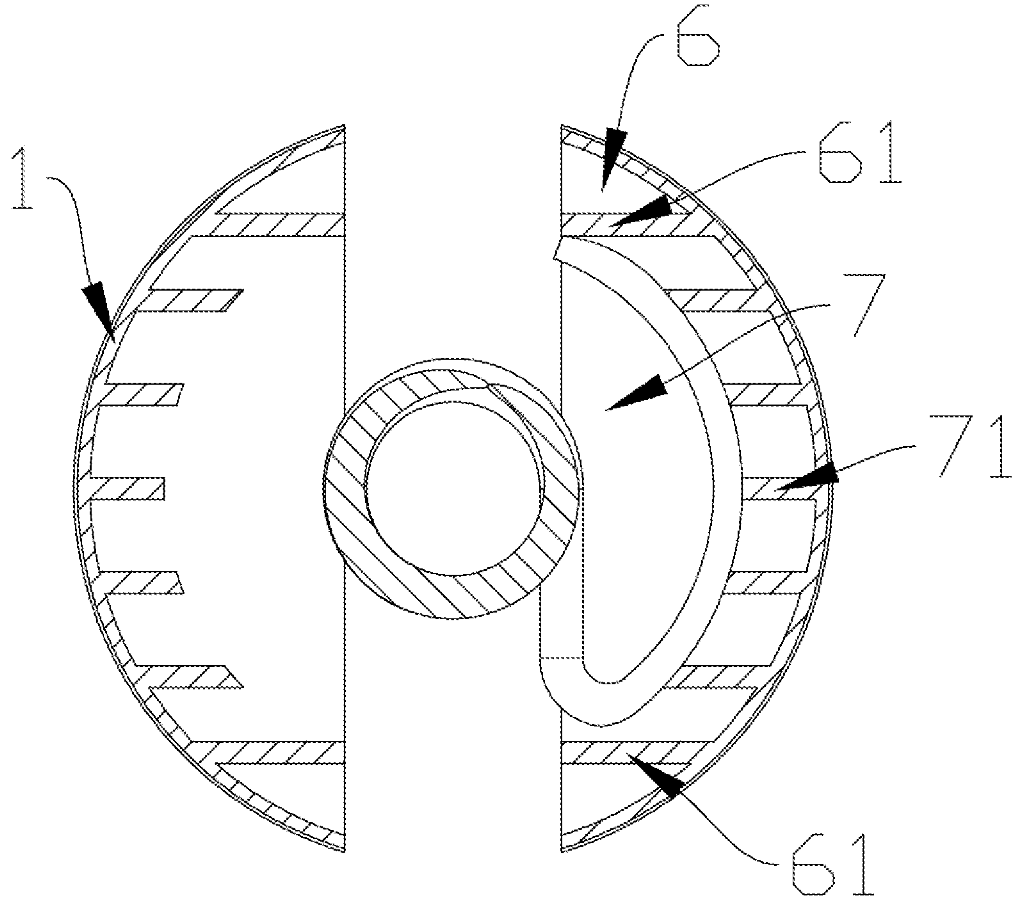
FIG. 4 is a section view at the position of an elastic cavity of a damping structure in the present disclosure.
Figure 5:
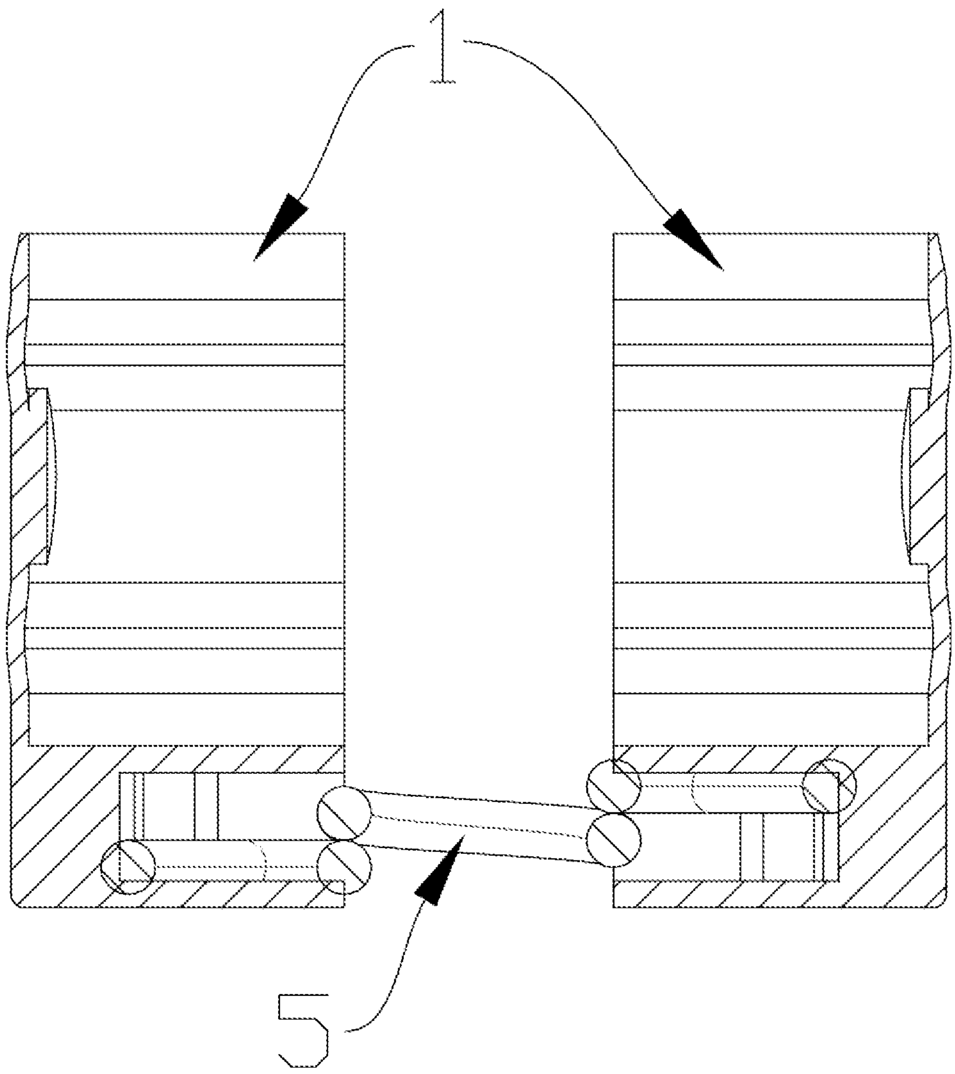
FIG. 5 is a section view of a damping structure in the present disclosure.
Figure 6:
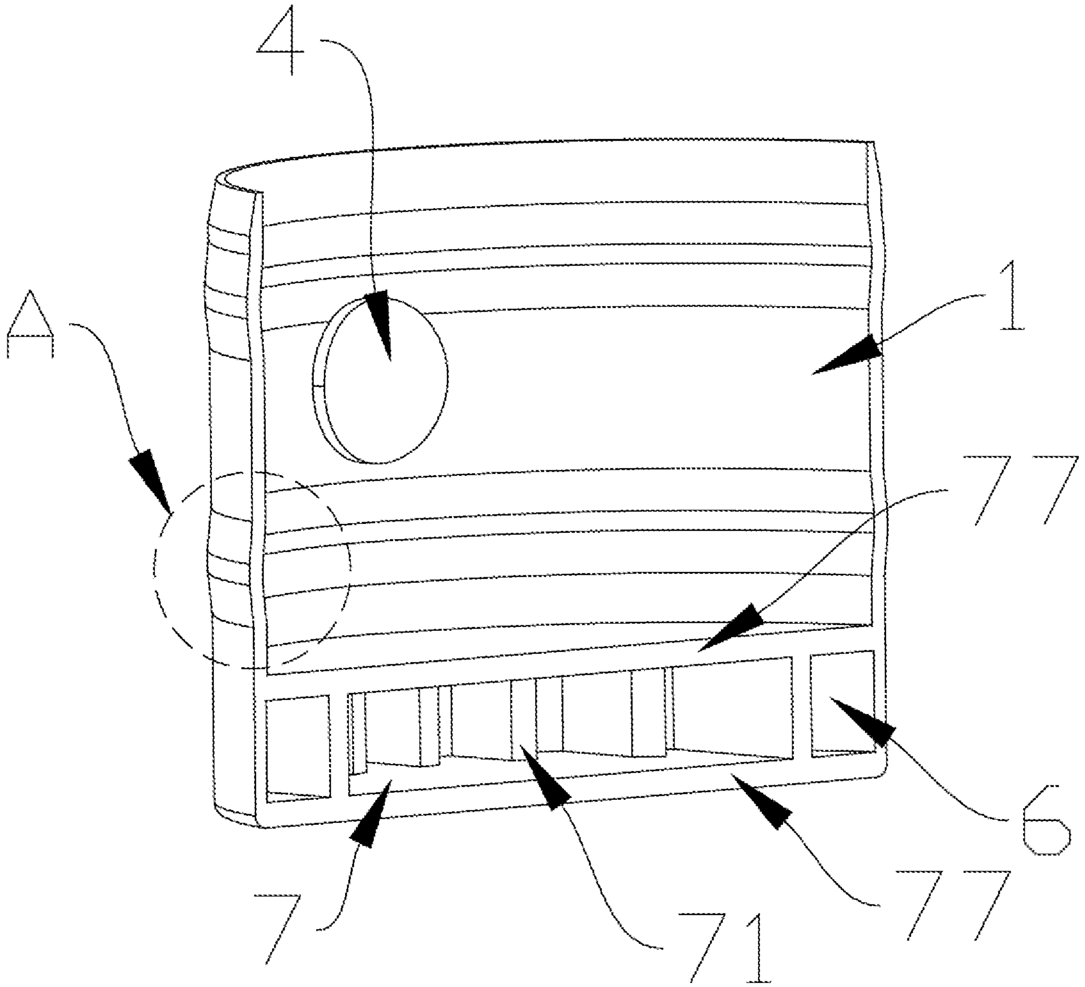
FIG. 6 is a space diagram of a damping assembly in the present disclosure.

From FIG. 4 and FIG. 6, it can be seen that in the present disclosure, a plurality of support plates 71 as the support structures are arranged in the elastic cavity 7. Preferably, five support plates 71 are uniformly distributed in each elastic cavity 7, and the structure is stable. The elastic arm 52 abuts against the support plate 71. Through the arrangement of the support plates 71, the structural strength in the elastic cavity 7 is obviously improved. At the same time, the support plates 71 abut against the elastic arm 52, the elastic force of the elastic arm 52 can be well received at multiple positions to ensure that the elastic force is uniformly applied to the damping assembly 1, and the stability is high. Moreover, in the present disclosure, spacing cavities 6 are formed in both ends of the elastic cavity 7 through spacing boards 61, and the two spacing boards 61 are used for limiting the bending section 521 at one end of the elastic arm 52 and the tail end 522 at the other end of the elastic arm 52. The elastic arm 52 is prevented from falling off or inclining, so that the stability is high. At the same time, excessive extrusion deformation of the elastic arm 52 is also avoided to ensure the whole structural strength.

From FIG. 6, it can be seen that the elastic cavity 7 is arranged at one end of the damping assembly 1, and is formed through a double-layer board body 77 in the axial direction. The support plate 71 and the spacing board 61 are integrally formed in the elastic cavity, and the structural strength is high.

Figure 7:
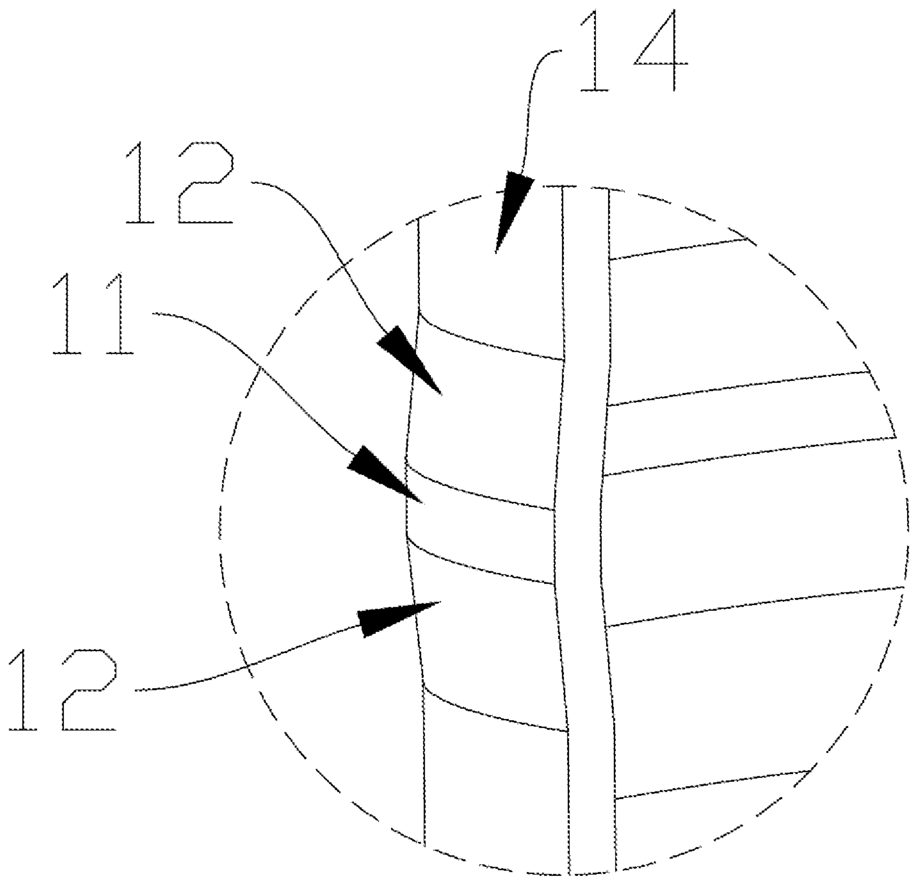
FIG. 7 is an enlarged view of part A in FIG. 6.

Further, from FIG. 7, it can be seen that in the present disclosure, the outer wall 14 of the damping assembly 1 is provided with a plurality of protruding damping surfaces 11, and an inclined plane 12 is arranged between the damping surface 11 and the outer wall 14. The effect of damping friction is good.

From the above description, it can be seen that in the present disclosure, the elastic piece 5 with a special structure is arranged to ensure that the elastic force can be uniformly applied to the damping assembly 1. Specifically, in the present disclosure, both sides of the elastic piece 5 are provided with elastic arms 52 which are arc-shaped, and a plurality of positions of the elastic arms 52 can well abut against the support structure in the elastic cavity 7, so that it is ensured that the elastic force can be applied at the positions to spread the damping assembly 1. Compared with the spring with the conventional structure, the elastic piece 5 of the structure can well avoid the phenomenon that the conventional spring is easy to shift, skew and fall off, and the stability is high when in use. After the damping structure is installed on the telescopic tube, and is located on the inner tube by the locating piece 4 on the inner wall of the damping assembly 1 and moves synchronously with the inner tube. During the expansion and contraction process of the inner tube and the outer tube of the telescopic tube, when the inner tube and the outer tube move relatively, the outer wall 14 of the damping assembly 1 rubs on the inner wall of the outer tube. At this time, the damping force is generated by the damping surface 11, the hand feeling is good, and the overall service life is long.

The damping structure which can be installed in the telescopic tube fitting in the present disclosure is provided with a spring with a special structure, so that elastic force can be ensured to be applied uniformly, the stability is high when in use, the damping structure is unlikely to shift, skew and fall off, the service life of the damping structure is greatly prolonged, and at the same time, the damping structure is simple in structure, convenient to assemble and good in damping hand feeling.

The scope of protection in the present disclosure includes but is not limited to the above-mentioned embodiments. The scope of protection in the present disclosure is subject to the claims, and any substitution, deformation and improvement easily thought of by those skilled in the art fall within the scope of protection in the present disclosure.

What is claimed is:

1. A damping structure, comprising two damping assemblies (1) which are oppositely arranged, and a gap being formed between the two damping assemblies (1), wherein an inner wall of each damping assembly (1) is provided with a locating piece (4) for locating, and an outer wall of each damping assembly (1) is provided with damping surfaces (11) which are used for providing damping during relative movement;

an elastic cavity (7) is formed in each damping assembly (1), and the two elastic cavities (7) on the two damping assemblies (1) are oppositely arranged;

the damping structure also comprises an elastic piece (5) having two sides, both sides of the elastic piece (5) are provided with elastic arms (52) bent into arcs, the two elastic arms (52) are respectively arranged in the two elastic cavities (7), and a plurality of positions on each elastic arm (52) abut against a plurality of support plates arranged in each elastic cavity (7);

spacing cavities (6) are formed in both ends of each elastic cavity (7) through a spacing board (61) on each end, and each spacing board (61) limits a bending section (521) at a first end of the elastic arm (52) and a tail end (522) at a second end of the elastic arm (52).

2. The damping structure according to claim 1, wherein the elastic piece (5) is formed by a rod body, and the rod body is a metal rod body or a polymer rod body.

3. The damping structure according to claim 2, wherein the elastic piece (5) comprises a spiral structure (51) located at the central position, straight sections (523) extend from both ends of the spiral structure (51), and the elastic arm (52) extends from an outer end of the straight section (523) through the bending section (521).

4. The damping structure according to claim 3, wherein the two straight sections (523) extend parallel to each other in the same direction, and the two elastic arms (52) are of symmetrical structures in the top view direction.

5. The damping structure according to claim 4, wherein when observed from the top view, the spiral structure (51) has a diameter of L1, and the distance between the outermost end of the elastic arm (52) and the spiral structure (51) is L2, and L1: L2=1.4-1.6.

6. The damping structure according to claim 5, wherein when observed from the top view, the distance between the outermost end of the bending section (521) and the spiral structure (51) is L3, and L1: L3=2.3-2.5; and the distance between the tail end (522) of the elastic arm (52) and the spiral structure (51) is L4, and L1: L4=1.8-1.9.

7. The damping structure according to claim 1, wherein the support plates of the plurality of support plates (71) are uniformly distributed in each elastic cavity (7).

8. The damping structure according to claim 7, wherein the damping surfaces (11) protrude from the outer wall (14) of the damping assembly (1), and an inclined plane (12) is arranged between each damping surface (11) and the outer wall (14).

* * * * *